United States Patent
Barreh et al.

(10) Patent No.: US 7,434,000 B1
(45) Date of Patent: Oct. 7, 2008

(54) HANDLING DUPLICATE CACHE MISSES IN A MULTITHREADED/MULTI-CORE PROCESSOR

(75) Inventors: Jama I. Barreh, Austin, TX (US); Manish K. Shah, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 435 days.

(21) Appl. No.: 11/008,016

(22) Filed: Dec. 9, 2004

Related U.S. Application Data

(63) Continuation-in-part of application No. 10/881,169, filed on Jun. 30, 2004, now Pat. No. 7,383,403.

(51) Int. Cl.
*G06F 12/00* (2006.01)
*G06F 9/46* (2006.01)

(52) U.S. Cl. .................... 711/118; 718/102; 718/107

(58) Field of Classification Search ................. 711/118; 718/102, 107
See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,423,016 A | 6/1995 | Tsuchiya et al. | |
| 5,515,308 A | 5/1996 | Karp et al. | |
| 5,546,593 A | 8/1996 | Kimura et al. | |
| 5,619,439 A | 4/1997 | Yu et al. | |
| 5,809,530 A | 9/1998 | Samra et al. | |
| 5,870,599 A * | 2/1999 | Hinton et al. | ................ 712/239 |
| 5,897,654 A * | 4/1999 | Eisen et al. | .................. 711/131 |
| 5,918,247 A | 6/1999 | Patel et al. | |
| 5,933,850 A | 8/1999 | Kumar et al. | |
| 5,954,789 A | 9/1999 | Yu et al. | |
| 6,016,542 A | 1/2000 | Gottieb et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |

(Continued)

OTHER PUBLICATIONS

Alverson et al., "Tera Hardware-Software Cooperation," Tera Computer Company, 1997, (16 pages).

(Continued)

*Primary Examiner*—Matt Kim
*Assistant Examiner*—Michael C Krofcheck
(74) *Attorney, Agent, or Firm*—Lawrence J. Merkel; Meyertons, Hood, Kivlin, Kowert & Goetzel, P.C.

(57) ABSTRACT

In one embodiment, a processor comprises a cache and a cache miss unit coupled to the cache. The cache miss unit is configured to initiate a cache fill of a cache line for the cache responsive to a first cache miss in the cache, wherein the first cache miss corresponds to a first thread of a plurality of threads in execution by the processor. Furthermore, the cache miss unit is configured to record an additional cache miss corresponding to a second thread of the plurality of threads, wherein the additional cache miss occurs in the cache prior to the cache fill completing for the cache line. The cache miss unit is configured to inhibit initiating an additional cache fill responsive to the additional cache miss.

19 Claims, 7 Drawing Sheets

Ready to Fetch = Normal Fetch | No New Miss

Clear WOM = Thread Redirected & (Primary Miss Wait | Duplicate Miss Wait)

U.S. PATENT DOCUMENTS

| | | | |
|---|---|---|---|
| 6,105,127 A | 8/2000 | Kimura et al. | |
| 6,131,104 A | 10/2000 | Oberman | |
| 6,145,054 A * | 11/2000 | Mehrotra et al. | 711/119 |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,381,676 B2 | 4/2002 | Aglietti et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,438,650 B1 * | 8/2002 | Quach et al. | 711/118 |
| 6,496,925 B1 | 12/2002 | Rodgers et al. | |
| 6,507,862 B1 | 1/2003 | Joy et al. | |
| 6,516,405 B1 * | 2/2003 | Jourdan et al. | 712/216 |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,658,534 B1 | 12/2003 | White et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,745,291 B1 | 6/2004 | York | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,871,264 B2 | 3/2005 | Soltis, Jr. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 7,032,076 B2 | 4/2006 | Sprangle et al. | |
| 7,134,002 B2 | 11/2006 | Shoemaker | |
| 2001/0054137 A1 * | 12/2001 | Eickemeyer et al. | 712/11 |
| 2003/0046521 A1 * | 3/2003 | Shoemaker | 712/228 |
| 2006/0026594 A1 | 2/2006 | Yoshida et al. | |
| 2006/0037017 A1 | 2/2006 | Accapadi et al. | |

OTHER PUBLICATIONS

Alverson et al., "The Tera Computer System," Tera Computer Company, 1990, (pp. 1-6).

Alverson et al., "Exploiting Heterogeneous Parallelism on a Multithreaded Multiprocessor," Tera Computer Company, 1992, (pp. 188-197).

Smith et al., "The End of Architecture," 17th Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

Office Action from U.S. Appl. No. 10/881,169 mailed Feb. 20, 2007.

Handy, "The Cache Memory Book," 1998, Academic Press, pp. 63-64.

Office Action from U.S. Appl. No. 11/008,014, mailed Oct. 9, 2007.

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen et al., "Exploiting Choice: Instruction Fetch and Issue on an Implementable Simultaneous Multithreading Processor," pp. 191-202, ISCA 1996.

Uhrig, et al., "Implementing Real-Time Scheduling Within A Multithreaded Java Microcontroller," 8 pages, 2002.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages, ACM 2002.

Eberle, et al., "Cryptographic Processor for Arbitrary Elliptic Curves over $GF(2^m)$," 11 pages, IEEE 2003.

* cited by examiner

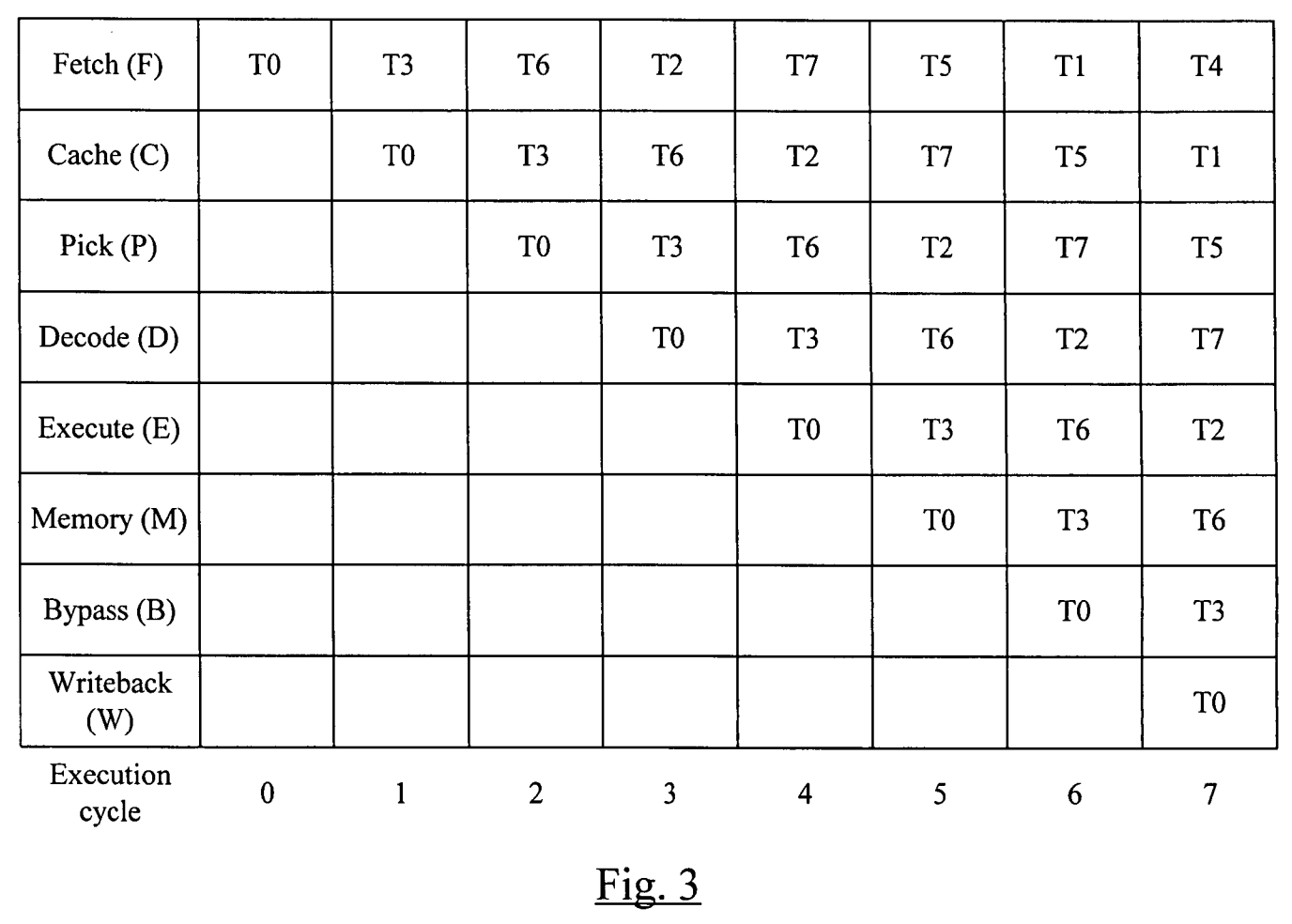

| Fetch (F) | T0 | T3 | T6 | T2 | T7 | T5 | T1 | T4 |
|---|---|---|---|---|---|---|---|---|
| Cache (C) |  | T0 | T3 | T6 | T2 | T7 | T5 | T1 |
| Pick (P) |  |  | T0 | T3 | T6 | T2 | T7 | T5 |
| Decode (D) |  |  |  | T0 | T3 | T6 | T2 | T7 |
| Execute (E) |  |  |  |  | T0 | T3 | T6 | T2 |
| Memory (M) |  |  |  |  |  | T0 | T3 | T6 |
| Bypass (B) |  |  |  |  |  |  | T0 | T3 |
| Writeback (W) |  |  |  |  |  |  |  | T0 |
| Execution cycle | 0 | 1 | 2 | 3 | 4 | 5 | 6 | 7 |

Fig. 3

Ready to Fetch = Normal Fetch | No New Miss

Clear WOM = Thread Redirected & (Primary Miss Wait | Duplicate Miss Wait)

HANDLING DUPLICATE CACHE MISSES IN A MULTITHREADED/MULTI-CORE PROCESSOR

This application is a continuation-in-part of U.S. patent application Ser. No. 10/881,169, filed on Jun. 30, 2004 now U.S. Pat. No. 7,383,403, incorporated herein by reference in its entirety.

BACKGROUND

1. Field of the Invention

This invention is related to processors and, more particularly, to cache miss handling in multithreaded processors.

2. Description of the Related Art

Presently, typical processors are single threaded. That is, the instructions that are being executed concurrently in the processor all belong to the same thread. Instruction fetching in such processors generally involves fetching instructions from the single thread. In various implementations, branch prediction schemes may be used to control fetching or sequential fetching may be implemented. In either case, fetching may be redirected (if a branch misprediction occurs, or for a taken branch in the sequential fetch implementation, or for an exception, trap, etc. in either case).

Most present processors implement an instruction cache to store instructions for rapid fetching by the processor. While instruction cache access latency is shorter than memory access latency (or access latency to lower level caches, if a cache hierarchy is implemented), the instruction cache has a limited capacity and thus is subject to cache misses. A cache miss occurs in a cache if an access to a given address is performed and the corresponding instructions/data are not stored in the cache. In contrast, a cache hit occurs if the access is performed and the corresponding instructions/data are stored in the cache (and are provided by the cache in response to the access). Typically, a cache allocates and deallocates storage in contiguous blocks referred to as cache lines. That is, a cache line is the minimum unit of allocation/deallocation of storage space in the cache.

When a cache miss occurs for a given cache line, the processor initiates a cache fill for that cache line. The cache fill generally includes retrieving the cache line from memory or a lower level cache and storing the cache line in the cache. While the cache fill is occurring for an instruction cache miss, instruction fetching is generally stalled in the single threaded processor. Since instruction execution cannot progress beyond the instruction cache miss, fetching instructions beyond the cache miss is not helpful. Since the processor is waiting on the instructions in the cache line returned for the cache fill, many single threaded processors attempt to bypass the instructions from the cache line into the processor's pipeline as the fill data arrives to be written into the instruction cache.

More recently, multithreaded processors have been proposed. Particularly, in fine grain multithreading, the processor may have two or more threads concurrently in process. Instructions may be issued from any of the threads for execution. Thus, in some cases, instructions from different threads may be in adjacent pipeline stages in the processor. Since multiple threads are being fetched, instruction fetching mechanisms may be more complex. Additionally, utilizing fetch bandwidth efficiently becomes even more important when multiple threads are being fetched.

SUMMARY

In one embodiment, a processor comprises a cache and a cache miss unit coupled to the cache. The cache miss unit is configured to initiate a cache fill of a cache line for the cache responsive to a first cache miss in the cache, wherein the first cache miss corresponds to a first thread of a plurality of threads in execution by the processor. Furthermore, the cache miss unit is configured to record an additional cache miss corresponding to a second thread of the plurality of threads, wherein the additional cache miss occurs in the cache prior to the cache fill completing for the cache line. The cache miss unit is configured to inhibit initiating an additional cache fill responsive to the additional cache miss.

In another embodiment, the cache miss unit is configured to record a primary miss to a cache line in the cache responsive to detecting the primary cache miss corresponding to a first thread of a plurality of threads in execution by the processor. If one or more duplicate cache misses to the cache line are detected corresponding to one or more other threads of the plurality of threads, the cache miss unit is configured to record the duplicate cache misses. The cache miss unit is configured to initiate a single cache fill corresponding to the primary miss and the duplicate cache misses.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
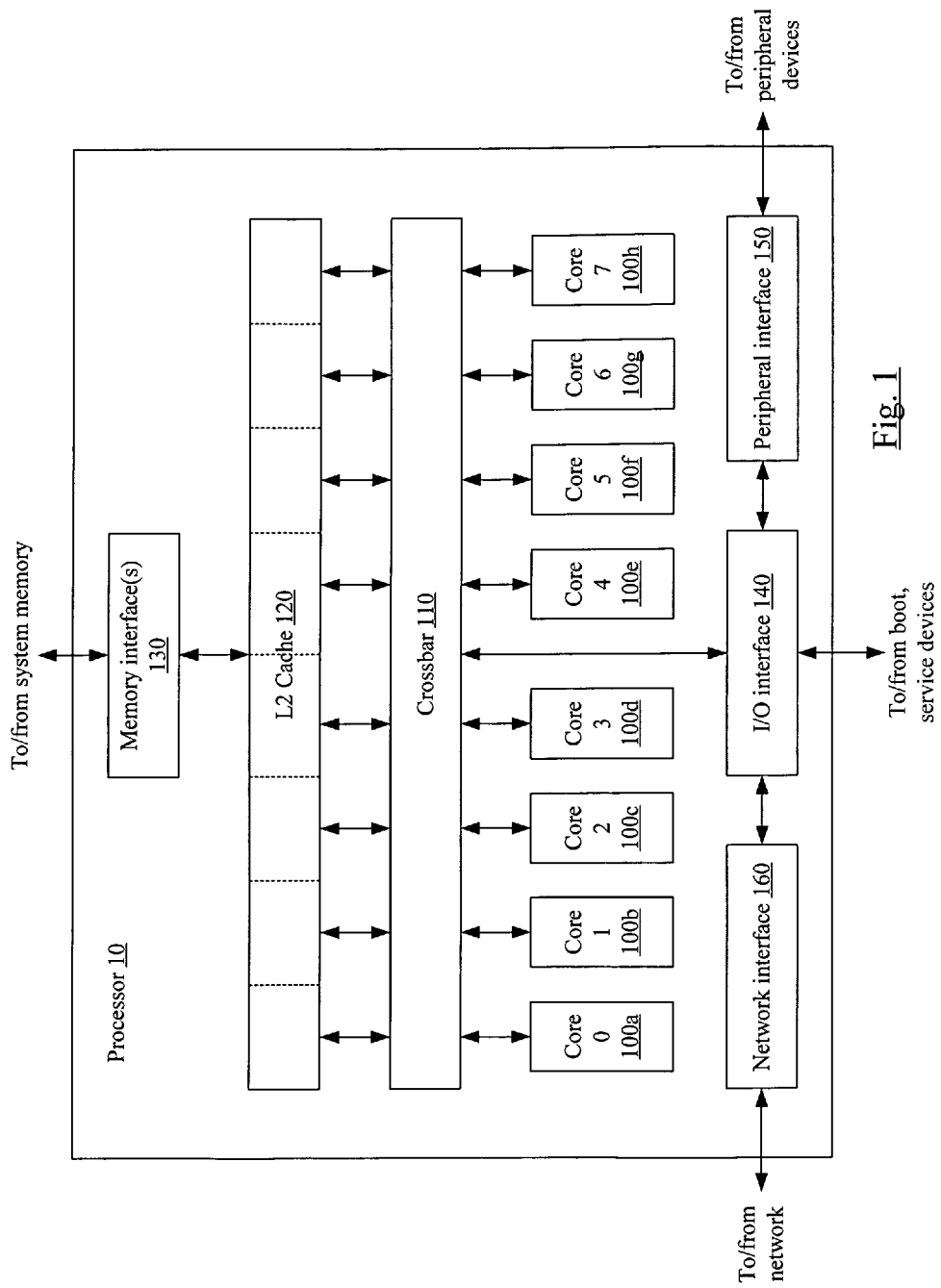
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
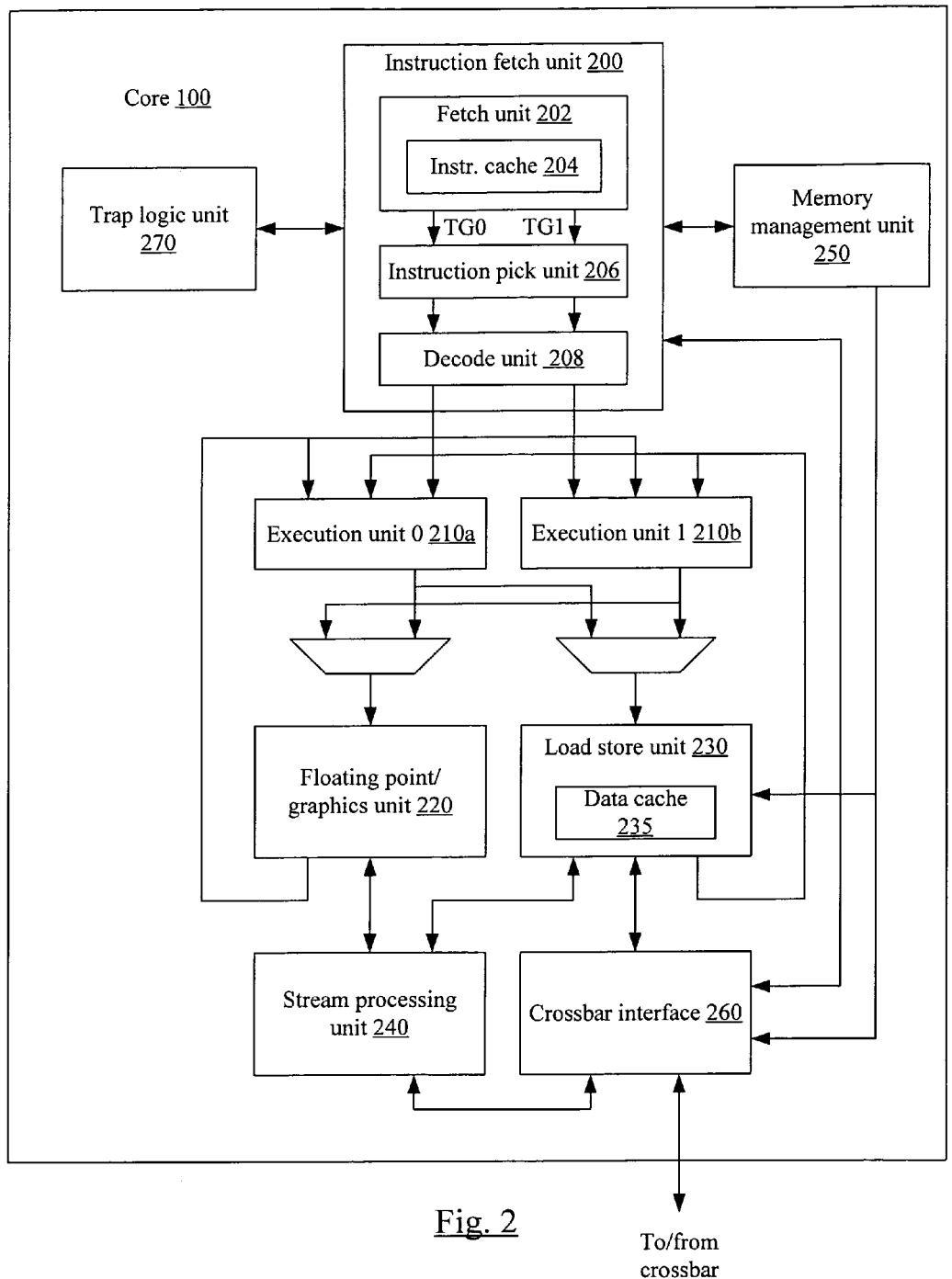
FIG. 2 is a block diagram of one embodiment of a core shown in FIG. 1.

FIGS. 1-3 present an overview of a multithreaded processor 10 that may implement the cache miss handling as described in more detail below. In other embodiments, the processor may be implement other multithreaded configurations, as desired.

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Cache Miss Handling

Figure 4:
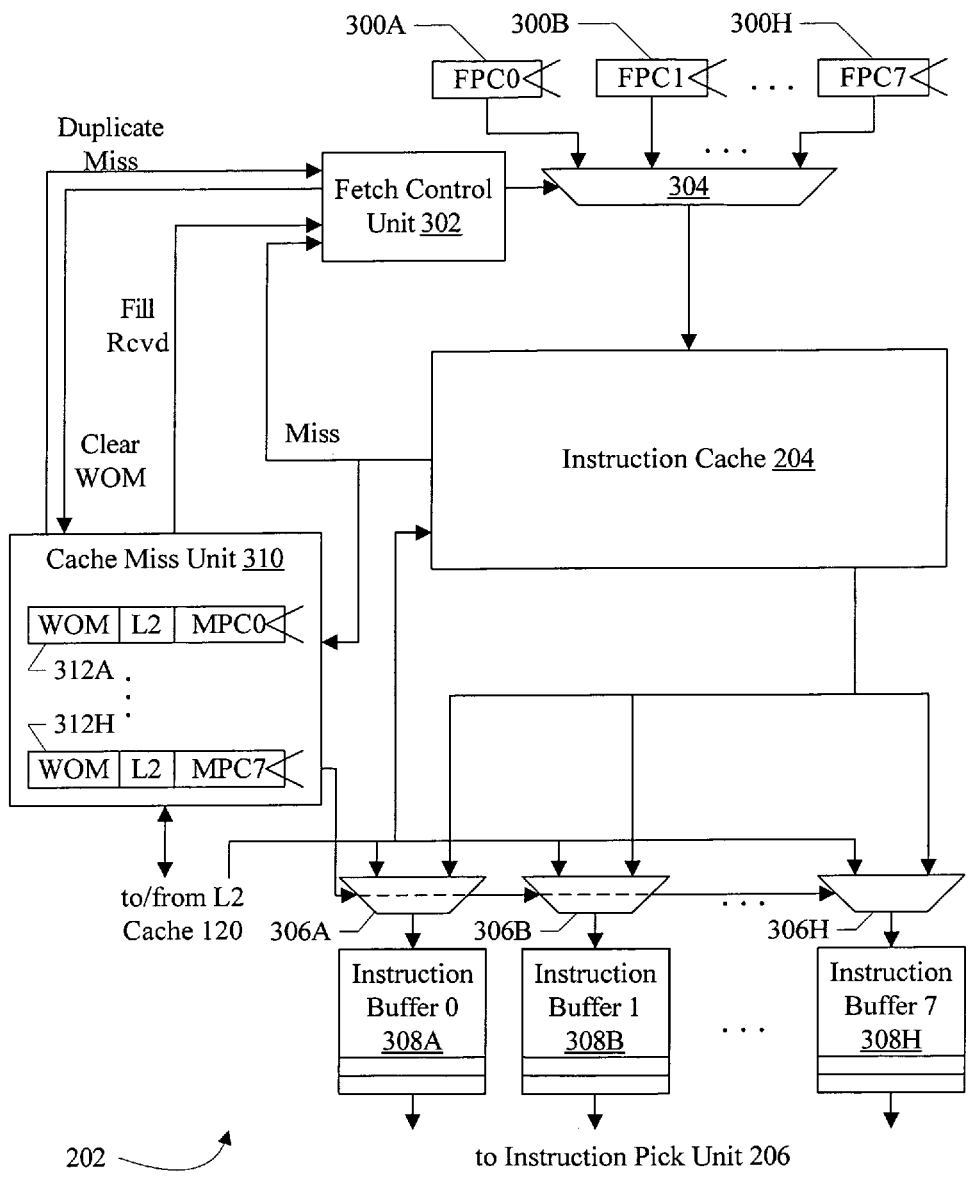
FIG. 4 is a block diagram illustrating one embodiment of a fetch unit shown in FIG. 2.
Figure 5:
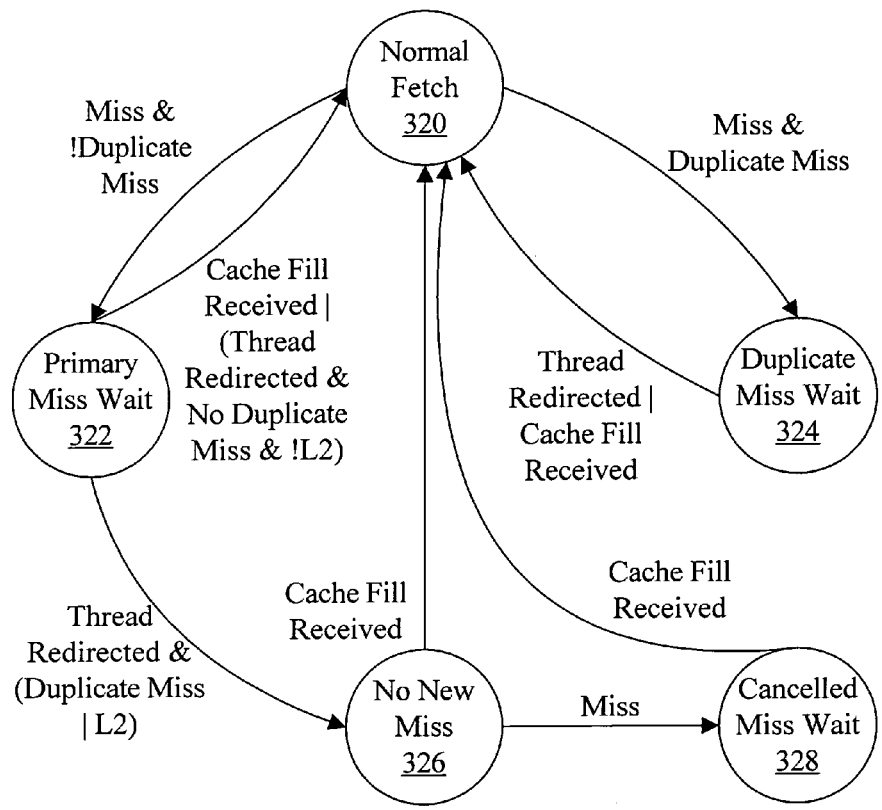
FIG. 5 is a state machine diagram illustrating one embodiment of a fetch state machine for a thread.
Figure 6:
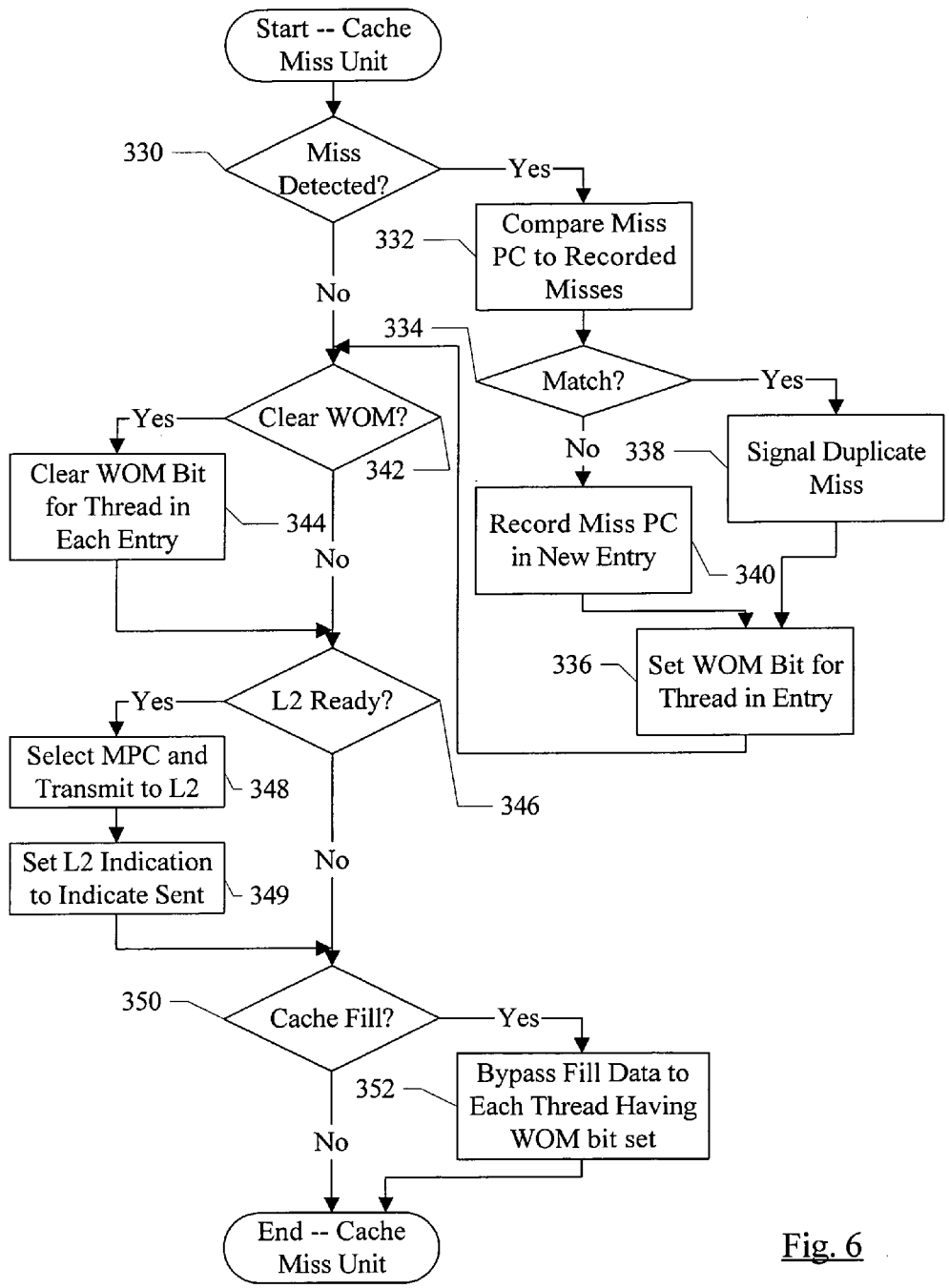
FIG. 6 is a flowchart illustrating operation of one embodiment of a cache miss unit shown in FIG. 4.

FIGS. 4-6 illustrate one embodiment of the fetch unit 202 and operation thereof for handling instruction cache misses. Specifically, since the fetch unit 202 fetches instructions from multiple threads that may be active (or in execution) by the core 100, the fetch unit 202 may detect if two or more threads experience a miss to the same cache line. Multiple misses for different threads to the same cache line may occur, e.g., if multiple instances of the underlying instruction code are being executed. Such instances may be executing the same instruction code, but are logically distinct and have separate contexts. In other cases, multiple misses to the same cache line for different threads may occur if some instruction code is shared between threads, even though the threads are logically separate.

As mentioned above, a thread may comprise a set of instructions that execute independently of the instructions from another thread. In some embodiments, the core 100 may maintain separate state for each thread. For example, the register state for each thread may be separate from other threads. That is, the core 100 may access and update separate register state for each thread.

Generally, the fetch unit 202 may detect an instruction cache miss for a cache line due to a fetch for a first thread, and may initiate a cache fill in response to the miss if no other miss to the cache line is outstanding. The miss for the first thread, with no other miss to the cache line outstanding, may be referred to herein as the "primary miss" or "primary cache miss". The fetch unit 202 may inhibit fetching for the first thread, and continue fetching for other threads that have not experienced a cache miss. If one or more other threads experience a cache miss for the same cache line prior to the cache fill completing for the cache line, the fetch unit 202 may also detect these misses (referred to as "duplicate misses" or "duplicate cache misses"). The fetch unit 202 may record the duplicate misses for the cache line, and associate each duplicate miss with the thread for which the duplicate miss was detected. The fetch unit 202 may inhibit initiating 10 additional cache fills corresponding to the duplicate misses. Viewed in another way, the fetch unit 202 may initiate a single cache fill responsive to the primary cache miss, and the duplicate cache misses may be recorded but may not cause additional cache fills. Thus, a single cache line in the instruction cache may be allocated for the cache line, and each of the threads may fetch from that cache line. Additionally, requests to the L2 cache 120 may be minimized, in some embodiments, by avoiding multiple cache fills for the same cache line.

In some embodiments, when the cache line is returned as a result of the cache fill to be written into the instruction cache 204, the fetch unit 202 may bypass at least one instruction from the cache line into the instruction buffer corresponding to the first thread (the thread corresponding to the primary miss). Additionally, the fetch unit 202 may concurrently bypass at least one instruction from the cache line into the instruction buffers corresponding to each thread having a duplicate miss to the cache line, in some embodiments. In some embodiments, fetch bandwidth may be used efficiently since instructions are concurrently bypassed to instruction buffers corresponding to multiple threads that are waiting on those instructions. Additionally, in some embodiments, fetch latency may be reduced by bypassing the instructions into the instruction buffers. Bypassing instructions into an instruction buffer may generally cause the instructions to be written directly into the instruction buffer, without first writing the instructions into the instruction cache and fetching the instructions from the instruction cache. For example, a bypass path may be provided to the instruction buffers for the cache line being written into the instruction cache. Other embodiments may not bypass the instructions to the instruction buffers.

Initiating a cache fill may include transmitting a request to a source that may provide the cache line. For example, in the present embodiment, the L2 cache 120 may be a source for the cache line. In other embodiments, lower level caches such as the L2 cache may not be provided and the source may be the memory subsystem external to the processor 10 (which may include caches, in some embodiments, and a system memory).

FIG. 4 illustrates certain components of one embodiment of the fetch unit 202 for implementing cache miss handling. Other components may be provided for other operation, as desired. In the illustrated embodiment, the fetch unit 202 includes a plurality of storage devices 300A-300H, each storing a fetch program counter (FPC) corresponding to a different one of the active threads being executed by the core 100. The fetch unit 202 further includes a fetch control unit 302, a multiplexor (mux) 304, the instruction cache 204, a set of bypass muxes 306A-306H, a set of instruction buffers 308A-308H, and a cache miss unit 310 in the illustrated embodiment. In the illustrated embodiment, the cache miss unit 310 includes a set of storage devices 312A-312H.

In the illustrated embodiment, the storage devices 300A-300H are coupled to the mux 304, which is further coupled to the instruction cache 206 and to receive selection controls from the fetch control unit 302. The fetch control unit 302 is coupled to receive a duplicate miss indication and a fill received (Fill Rcvd) indication from the cache miss unit 310. Additionally, the fetch control unit 302 is coupled to receive a miss indication from the instruction cache 204. The fetch control unit 302 is coupled to provide a clear waiting on miss (WOM) indication to the cache miss unit 310. The instruction cache 204 is coupled to provide instructions, in the event of a cache hit, as an input to the bypass muxes 306A-306H, which are also coupled to receive cache line data from the L2 cache 120 as an input. Additionally, the instruction cache 204 is coupled to receive the cache line data. The bypass muxes 306A-306H are coupled to receive selection controls from the cache miss unit 310, and have outputs coupled to respective instruction buffers 308A-308H, which are further coupled to the instruction pick unit 206. The cache miss unit 310 is coupled to communicate with the L2 cache 120.

In one embodiment, the instruction cache 204 may be N-way set associative (e.g. 8-way set associative in one implementation). In some embodiments, the number of ways may be greater than or equal to the maximum number of threads in the core 100. Other embodiments may implement direct mapped configurations or other configurations. The instruction cache 206 may further include an instruction TLB (ITLB), or an ITLB may be accessed in parallel with the instruction cache 206, in embodiments which implement virtual to physical address translation. The instruction cache 206 is further coupled to provide a miss indication to the fetch control unit 302 and the cache miss unit 310.

The operation of the embodiment of FIG. 4 may occur over several pipeline stages (although the number of pipeline stages and the assignment of operations to pipeline stages may vary from embodiment to embodiment). Pipeline storage devices have not been shown in FIG. 4, but may be inserted as desired at appropriate points. In one embodiment, the fetch control unit 302 may select (or schedule) a thread to fetch from the active threads in a "before fetch" (BF) stage, not shown in FIG. 3. While the illustrated embodiment shows the storage devices 300A-300H as sources of a fetch PC, other embodiments may include additional sources to the mux 304 (e.g. redirect PCs from various pipeline stages such as execute and writeback). The selected fetch PC is provided to the instruction cache 204, along with an indication of the selected thread such as a thread tag or thread identifier. The fetch control unit 302 may be further configured to update the various fetch PCs due to a fetch, a redirect of a thread, cache miss, fetch error, etc. (not shown in FIG. 4). As used herein, a PC may be any representation of the address at which an instruction or instructions are stored (e.g. a virtual address, a physical address, a portion of the address, etc.).

During the fetch stage, the instruction cache 204 accesses the instruction cache tags and cache lines responsive to the fetch PC. In one embodiment, the ITLB is also accessed and ITLB hit/miss is determined in the fetch stage as well, although other embodiments may make the hit/miss determination in the cache stage. In the cache stage, the instruction cache 204 determines instruction cache hit/miss for the fetch, and selects the hitting cache line for output to the bypass muxes 306A-306H if a hit is detected. For example, in some embodiments, the instruction cache 204 is physically tagged (that is, the instruction cache tags are physical addresses of the instruction cache lines) and the instruction cache 204 may compare the physical address from the ITLB with the tags to detect a hit/miss. In other embodiments, the instruction cache 204 may be virtually tagged (that is, the instruction cache tags are virtual addresses of the instruction cache lines) and the instruction cache 204 may compare the fetch PC with the tags to detect hit/miss. In a cache hit case, the cache miss unit 310 may generate selection controls for the bypass muxes 306A-306H to select the instructions from the instruction cache for storage in the instruction buffer 308A-308H corresponding to the thread that was fetched.

If a cache miss is detected, the instruction cache 206 may provide an indication of the miss to the fetch control unit 302 and the cache miss unit 310. For example, the instruction cache 204 may signal the miss and identify the thread for which the miss is detected. The fetch PC may be routed to the corresponding storage device 300A-300H for update (not shown in FIG. 4). Alternatively, the fetch control unit 302 may track which threads are in the fetch and cache stages and the instruction cache 204 may signal the miss to the fetch control unit 302 without identifying the thread.

The instruction cache 204 may also signal the miss to the cache miss unit 310. For the cache miss unit 310, the instruction cache 204 may identify the thread corresponding to the fetch that experienced the miss. Additionally, the instruction cache 204 may provide the miss PC to the cache miss unit 310. The miss PC may be the physical address corresponding to the fetch PC, as provided from the ITLB in the present embodiment.

The cache miss unit 310 may determine if the miss is a primary miss or a duplicate miss. For example, each outstanding miss may be recorded in one of the storage devices 312A-312H. The cache miss unit 310 may compare (on a cache line granularity) the miss PC provided by the instruction cache 204 to the addresses of the previously detected misses in the storage devices 312A-312H. If the miss is already recorded in one of the storage devices 312A-312H, the miss is a duplicate miss. If the miss is not already recorded, the miss is a primary miss and the miss PC is recorded in one of the storage devices 312A-312H.

In one embodiment, the cache miss unit 310 may support up to one outstanding primary cache miss per thread. Storage devices 312A-312H may be permanently allocated to particular threads (to store the miss PC for the primary miss from that particular thread), or may be used as needed to store miss PCs corresponding to any thread. Other embodiments may support more or fewer outstanding cache misses and/or more or fewer outstanding misses per thread. A cache miss is outstanding if the cache miss has been detected with respect to a fetch of at least one thread, and the cache line has not yet been returned and written into the instruction cache 204 to complete the cache fill.

For each outstanding miss, the cache miss unit 310 may record which threads have a miss pending for the cache line.

The waiting on miss (WOM) indication in each storage device 312A-312H may be used to record the pending misses. For example, the WOM indication may include a bit for each thread that may be active in the core 100. If the bit is set, the thread has a pending miss for the cache line indicated by the corresponding miss PC. If the bit is clear, the thread does not have a pending miss for the cache line indicated by the corresponding miss PC. Other embodiments may reverse the set and clear meanings of the bit or use other indications. A miss may be pending for a thread if the miss has been detected for a fetch corresponding to the thread, and the thread has not been redirected from the fetch that corresponds to the miss. Additional details are provided below for one embodiment.

When a primary miss is detected, the cache miss unit 310 may store the miss PC in one of the storage devices 312A-312H and the cache miss unit 310 may set the WOM bit in that storage device 312A-312H that corresponds to the thread experiencing the primary miss. When a duplicate miss is detected, the cache miss unit 310 may set the WOM bit corresponding to the thread experiencing the duplicate miss in the storage device 312A-312H that stores the miss PC. Additionally, the cache miss unit 310 may signal the duplicate miss to the fetch control unit 302 in the present embodiment. In conjunction with the miss from the instruction cache 204, the fetch control unit 302 may distinguish primary cache misses (no duplicate miss signal assertion) from duplicate cache misses (duplicate miss signal assertion).

The cache miss unit 310 is configured to communicate with the L2 cache 120 to initiate a cache fill for each outstanding cache miss. In other embodiments, the L2 cache 120 may not be provided and the cache miss unit 310 may communicate with memory interface(s) 130 to initiate cache fills. Generally, the cache miss unit 310 may provide the miss PC for the cache fill to the L2 cache 120. In some embodiments, an identifier may be provided as well (e.g. an indication of which storage device 312A-312H stores the miss PC) to identify the return of the cache line to complete the cache fill. In the illustrated embodiment, the L2 field in each of the storage devices 312A-312H may be used to track which of the miss PCs have had corresponding cache fills initiated (e.g. by transmitting the cache fill request to the L2 cache 12). The L2 field may, e.g., be a bit indicating that the cache fill has been initiated when set and indicative that the cache fill has not been initiated when clear. Other embodiments may use the opposite meanings of the set and clear states of the bit or may use other indications. In still other embodiments, a request bit may be maintained for each storage device 312A-312H (in the storage devices, or separately maintained as a group). The request bit may indicate whether or not a pending request is still to be transmitted to the L2 cache 120 for the miss PC in the corresponding storage device 312A-312H.

The L2 cache 120 may indicate to the cache miss unit 310 that a cache line is being provided for storage in the instruction cache 204 (e.g. using the identifier supplied by the cache miss unit 310). The cache miss unit 310 may use the WOM indication from the corresponding storage device 312A-312H to identify which threads have the miss pending at the time the cache fill is provided, and may generate selection controls to the bypass muxes 306A-306H to select one or more instructions from the cache line for storage in each of the instruction buffers 308A-308H that correspond to a thread that has the miss pending. Thus, one or more instructions may be concurrently stored into more than one instruction buffer 308A-308H if more than one thread has a miss pending for the cache line. The instructions are written into the instruction buffers 308A-308H as the cache line is returned for storage in the instruction cache 204. The instruction cache 204 is also coupled to receive the cache line for storage. Additionally, the cache miss unit 310 may signal the fetch control unit 302 that a cache fill has been received, and may identify which threads the cache fill corresponds to (Fill Rcvd indication in FIG. 4). For example, the Fill Rcvd indication may include a signal for each thread, which may be asserted if a fill has been received for which that thread had a miss pending (as indicated by the WOM bits).

It is noted that, in some cases, the fetches for different threads may identify different instructions within the cache line (that is, the cache line offset portion of the fetch PCs may differ). In such cases, the instructions to be bypassed to the different threads also differ. In some embodiments, the different offsets may be represented in the cache miss unit 310, to permit the correct instructions to be written into each instruction buffer 308A-308H. For example, the bypass muxes 306A-306H may be coupled to select any set of one or more contiguous instructions from the returning cache line to be written into the corresponding instruction buffer 308A-308H. Different selection controls for each bypass mux 306A-306H may be generated to select the correct instructions for each thread. In other embodiments, bypassing to multiple instruction buffers may only be performed if the same offset is fetched by each thread. In such embodiments, the misses to the same cache line from different threads may still be detected as duplicate misses, but bypassing to the duplicate miss threads having different offsets may be inhibited. After the instruction cache line is written to the instruction cache 204, the duplicate miss threads with different offsets may refetch from the instruction cache 204 in such embodiments.

While the cache miss unit 310 controls the bypass muxes 306A-306H in this embodiment, the cache miss unit 310 may cause at least one instruction from the cache line to be stored into the instruction buffers 308A-308H that have a miss pending for the cache line in any desired fashion. For example, the instruction buffers 308A-308H may have multiple input ports, one for instructions supplied by the instruction cache 204 and another for instructions being bypassed when a cache line is returned for storage in the instruction 204. The cache miss unit 310 may provide write enables corresponding to the bypass port.

In some embodiments, a thread may be redirected after a cache miss (either primary or duplicate) has been detected. Generally, a thread may be referred to as "redirected" if execution of a previously fetched instruction causes instruction fetching to begin at a different address than the subsequent fetching used. For example, exceptions, traps, or interrupts experienced when executing an instruction may cause the thread to be redirected to an exception, trap, or interrupt handler. Control transfer instructions that are mispredicted (or, in the present embodiment, taken control transfer instructions) may cause fetching to be redirected to the correct address (target or sequential) of the control transfer instruction. If a redirect occurs after a cache miss has been detected for the thread, the instructions from the missing cache line may no longer be needed for that thread. The fetch control unit 302 may begin fetching the thread at the redirect address in response to a redirect. Additionally, in response to the redirect, the fetch control unit 302 may signal the cache miss unit 310 that the instructions from the missing cache line are no longer needed for the redirected thread using the clear WOM indication. The clear WOM indication may be any communication that identifies a thread or threads to be cleared from the WOM bits in the storage devices 312A-312H. For example, the clear WOM indication may include a signal for each thread that may be asserted to clear the pending miss for that thread. Alternatively, the clear WOM indication may be a numerical value identifying the thread for which the WOM bits in the storage devices 312A-312H are to be cleared. The cache miss unit 310, in response to the clear WOM indication, may clear the corresponding WOM bits, if any, to indicate that a miss is no longer pending for the thread. In this fashion, the WOM bits in the storage devices 312A-312H may be updated such that they reflect which threads still have a miss pending when the cache line is returned for storage in the instruction cache 204. While the clear WOM indication is used in the present embodiment, in general a pending miss may be cancelled in any desired fashion when the corresponding thread is redirected.

The cache miss unit 310 and the fetch control unit 302 may respond to the clear WOM indication (or other cancellation of a miss) in different fashions, in one embodiment, depending on whether the cancelled miss is a primary miss or a duplicate miss. If the cancelled miss is a duplicate miss, the miss may be cancelled independent of other factors. The corresponding thread may begin fetching in response to the redirect, and may experience another cache miss (either duplicate or primary) as if the cancelled duplicate miss did not occur. If the cancelled miss is a primary miss, the miss may be cancelled and the corresponding thread may begin fetching freely in response to the redirect if the corresponding cache fill has not been initiated (e.g. according to the L2 indication in the storage device 312A-312H storing the miss) and if there are no pending duplicate misses for the cache line (e.g. as indicated by the WOM bits). If either the cache fill has been initiated or there are duplicate misses pending (or both), the primary miss may be cancelled (at least with respect to permitting the fetch to restart for the corresponding thread) and the corresponding thread may begin fetching according to the redirect. However, a new miss for the corresponding thread may not be permitted until the cache fill completes for the previous miss.

It is noted that, in some embodiments, more than one clock cycle may be used to transfer the cache line to the instruction cache 204 for storage. For example, in one embodiment, ½ of the cache line may be transferred in each of two clock cycles. Bypassing of instructions may be performed in one or both clock cycles, in various implementations. It is further noted that, in some embodiments, the instruction cache 204 may not include a separate port for writing cache lines provided in response to cache fills. In such embodiments, the fetch control unit 302 may not initiate a fetch on a clock cycle that a cache line is being written to the instruction cache 204.

It is noted that, in the present embodiment, each of the instruction buffers 308A-308H corresponds to a different thread of the plurality of threads that the core 100 may have concurrently in process. Each instruction buffer 308A-308H may include at least one entry, and may have multiple entries. Any number of entries may be provided (e.g. 8 entries, in some embodiments). The instruction buffers 308A-308H may have any construction. However, in one implementation, each instruction buffer 308A-308H may comprise a single register storing entry 0 of the buffer (the oldest instruction in the buffer) and a memory array storing the remaining entries (with pointers indicating the oldest and youngest instructions in the memory array). As instructions are successfully issued for execution, the next instruction in program order may be read from the memory array and shifted into the register.

In the present embodiment, the instruction buffers feed the instruction pick unit 206, which schedules instructions for execution (e.g. according to thread group, as discussed above). Other embodiments may have other constructions.

For example, each instruction buffer may feed dedicated resources for the thread (e.g. execution resources may be dedicated to each thread).

While muxes 304 and 306A-306H are illustrated in FIG. 4, any selection devices may be used as desired, including parallel or cascaded sets of muxes. Additionally, storage devices 300A-300H and 312A-312H may comprise any sort of storage device (e.g. latches, flops, registers, etc.).

While the illustrated embodiment describes handling of misses in the instruction cache 204, a similar mechanism may be used to handle misses in the data cache 235 (e.g. recording primary and duplicate misses, transmitting one request to the L2 cache for the corresponding cache line, stalling fetch for threads that experience the miss, cancelling misses, etc.). If a thread experiences a data cache miss, the thread may be flushed from the pipeline of the core 100, in some embodiments (e.g. to prevent instructions dependent on the result of the cache access that caused the miss from executing) and fetching may be restarted at the instruction that experienced the data cache miss when the cache fill is completed.

Turning now to FIG. 5, a state machine diagram is shown illustrating one embodiment of a state machine that may be implemented by the fetch control unit 302 for a thread. The fetch control unit 302 may implement a similar state machine for each thread that may be active in the core 100 (e.g. 8 threads in one embodiment, although more or fewer threads may be supported in other embodiments). The state machine for each thread may be independent of the state machines for other threads. In the illustrated embodiment, the state machine includes a normal fetch state 320, a primary miss wait state 322, a duplicate miss wait state 324, a no new miss state 326, and a cancelled miss wait state 328. Transitions between the states are shown in FIG. 5. When in a given state, the state machine may remain in that state until one of the transitions from that state occurs. It is noted that other states may be implemented to provide additional function, in other embodiments, if desired.

In the normal fetch state 320, the thread may be eligible to be scheduled for fetching. The state machine transitions from the normal fetch state 320 to one of the primary miss wait state 322 and the duplicate miss wait state 324 responsive to a cache miss on a fetch from the thread. The transition is from the normal fetch state 320 to the primary miss wait state 322 if the miss is a primary miss for the cache line, and to the duplicate miss wait state 324 if the miss is a duplicate miss for the cache line (as indicated by the duplicate miss signal from the cache miss unit 310). From either state, if the cache fill corresponding to the miss occurs (indicated by the fill received indications from the cache miss unit 310), the state machine transitions back to the normal fetch state 320.

The use of two wait states for a cache miss in the present embodiment permits different handling in the case of a redirect after the miss is detected. In the illustrated embodiment, one primary miss per thread is permitted. However, any number of duplicate misses may be experienced and redirected away from in this embodiment.

Accordingly, if the state machine is in the primary miss wait state 322 and a redirect occurs for the thread, the state machine transitions to either the no new miss state 326 or the normal fetch state 320. Particularly, if a redirect occurs for the thread in the primary miss wait state 322 and there are no duplicate misses recorded for the cache miss and the cache fill has not been initiated (as indicated by the L2 field in the corresponding storage device 312A-312H), the state machine transitions to the normal fetch state 320 and fetching is permitted without restriction on the detection of new misses. The corresponding cache miss in the cache miss unit 310 may be cancelled and the cache fill may not be initiated. On the other hand, if the redirect occurs for the thread in the primary miss wait state 322 and either the cache fill has been initiated or a duplicate miss has been recorded, the state machine transitions to the no new miss state 326. In the no new miss state 326, fetching is permitted as long as another miss is not detected for the thread. If a miss is detected, the state machine transitions to the cancelled miss wait state 328. If the cache fill is received in either the no new miss state 326 or the cancelled miss wait state 328, the state machine transitions to the normal fetch state 320. As shown in FIG. 5, if the state machine is in the duplicate miss wait state 322 and a redirect occurs for the thread, the state machine transitions to the normal fetch state 320.

In some embodiments, fetching may be stalled to permit a cache line to be written into the instruction cache 204. In such embodiments, the state machine may include one or more wait states for the fill. For example, a fill wait state may be provided for each clock cycle used to write the fill data to the instruction cache 204.

The fetch control unit 302 may use the state of the state machine shown in FIG. 5 for each thread to determine which threads are ready to fetch, and may schedule one of the ready threads to fetch in a given clock cycle. As shown by the "ready to fetch" equation in FIG. 5, the fetch control unit 302 may deem a thread ready if the thread's state machine is in either the normal fetch state 320 or the no new miss state 326, for this embodiment. That is, the fetch control unit 302 may enable the thread for scheduling to fetch if the state machine is in either the normal fetch state 320 or the no new miss state 326. For other states, the fetch control unit 302 may inhibit fetching for the thread (e.g. the primary miss wait state 322, the duplicate miss wait state 324, and the cancelled miss wait state 328, in the illustrated embodiment).

Additionally, the fetch control unit 302 may generate the clear WOM indication for a given thread based on a redirect of the thread. For example, as indicated in the clear WOM equation in FIG. 5, the fetch control unit 302 may cause a clearing of the thread's WOM bit in each storage device 312A-312H if the thread is redirected and it is in either the primary miss wait state 322 or the duplicate miss wait state 324.

Turning now to FIG. 6, a flowchart is shown illustrating operation of one embodiment of the cache miss unit 310 in response to various events. The cache miss unit 310 may include circuitry implementing the operation shown in FIG. 6. While the blocks shown in FIG. 6 are illustrated in a particular order to ease understanding, blocks may be implemented in parallel in combinatorial logic circuitry in the cache miss unit 310. In other cases, blocks may be pipelined over two or more clock cycles, as desired. Particularly, the decision blocks 330, 342, 346, and 350 may illustrate independent events that may be handled in parallel (along with the blocks dependent therefrom) by the cache miss unit 310. The storage devices 312A-312H are referred to in the flowchart as "entries" for brevity in the figure.

If a cache miss is signalled by the instruction cache 204 (decision block 330, "yes" leg) the cache miss unit 310 may compare the miss PC to the recorded misses in the storage devices 312A-312H (block 332). The comparison may be made on a cache line granularity (e.g. the least significant bits of the addresses, that define an offset within a cache line, may be ignored for comparison purposes). If a match is detected (decision block 334, "yes" leg), the cache miss unit 310 may signal duplicate miss to the fetch control unit 302 (block 338). Additionally, the cache miss unit 310 may set the WOM bit that corresponds to the thread experiencing the miss in the matching storage device 312A-312H (block 336). If no match is detected (decision block 334, "no" leg), the cache miss unit 310 may record the miss PC in one of the storage devices 312A-312H that is not currently in use (block 340). The cache miss unit 310 may also set the WOM bit corresponding to the thread for which the miss is detected (block 336).

If a clear WOM indication is received from the fetch control unit 302 (decision block 342, "yes" leg), the cache miss unit 310 may clear the WOM bit (or bits) corresponding to the thread (or threads) indicated by the clear WOM indication in each of the storage devices 312A-312H (block 344). Clearing the WOM bit corresponding to the thread may cancel the miss for that thread, in this embodiment.

If arbitration is performed to access the L2 cache 120, the cache miss unit 310 may arbitrate if the cache miss unit 310 is storing at least one miss PC for which a cache fill has not yet been initiated. If the L2 cache 120 indicates that it is ready to receive a cache fill request from the cache miss unit 310 (decision block 346, "yes" leg), the cache miss unit 310 may select a miss PC that for which the cache fill has yet to be initiated and transmits the miss PC to initiate the cache fill for that cache line (block 348). Additionally, the cache miss unit 310 may set the L2 indication in the selected entry to indicate that the cache fill request has been sent to the L2 cache 120 (block 349). In other words, the cache miss unit 310 may set the L2 indication in the selected entry to indicate that the cache fill has been initiated. The L2 cache 120 may indicate that it is ready to receive a request by declaring the cache miss unit 310 the winner of the arbitration, or may use any other mechanism to determine that it is ready to receive a cache fill request from the cache miss unit 310.

Any mechanism may be used to select a cache miss for initiating a cache fill, in various embodiments. For example, in one embodiment, the mechanism may prioritize the misses based on which thread is associated with the primary miss. The mechanism may include a "favor bit" which indicates one of the thread groups from which a thread is to be selected (e.g. the thread group from which a thread was not selected the previous time that the L2 accepted a cache fill request from the cache miss unit 310). A pair of rotating pointers may be used to identify one of the threads within each thread group, respectively. The rotating pointers prioritize the threads within the thread group. That is, the highest priority thread in the thread group is the thread indicated by the pointer, and the remaining threads are scanned in increasing order of thread ID within the thread group (beginning from the thread indicated by the pointer), wrapping around to the beginning of the thread group and continuing to the lowest priority thread (having a thread ID one less than the thread ID indicated by the corresponding rotating pointer). The cache miss unit 310 may select the primary miss associated with the highest priority thread within the favored thread group indicated by the favor bit. If there is no primary miss in the favored thread group, a miss from the other thread group may be selected. The pointer for the selected thread group may be updated to point to the next highest priority thread that has a valid primary miss (thus changing the priority within the selected thread group) and the favor bit may be updated to indicate the non-selected thread group.

If the L2 cache 120 indicates that a cache line is being provided in response to the cache fill (decision block 350, "yes" leg), the cache miss unit 310 bypasses the fill data to each thread having the WOM bit set in the corresponding storage device 312A-312H (block 352). For example, in the embodiment of FIG. 4, the cache miss unit 310 may generate selection controls for the bypass muxes 306A-306H to write at least one instruction into each instruction buffer 308A-

308H that corresponds to a thread that is waiting for instructions from the missing cache line. As mentioned previously, in other embodiments, bypassing may not be implemented. Additionally, the cache miss unit 310 may clear the primary miss and any duplicate misses for the cache line corresponding to the cache fill. For example, the cache miss unit may clear the WOM bits in the storage device 312A-312H storing the corresponding miss PC and may invalidate the miss PC as well.

In some embodiments, certain instruction fetches may be uncacheable. For example, a fetch that addresses an input/output (I/O) space may be uncacheable. Additionally, some pages may be indicated as uncacheable in the virtual to physical address translation (and the uncacheability may be stored in the ITLB). Uncacheable fetches may be treated similar to cache misses, in one embodiment. However, in one embodiment, each uncacheable fetch may be treated as a primary miss. That is, uncacheable fetches are not checked against misses in the cache miss unit 310 to determine if they are "duplicate misses". Additionally, when the cache line is returned for the uncacheable fetch, the cache line is not written to the instruction cache 204. The instructions are bypassed to the corresponding instruction buffer 308A-308H and the cache line is discarded.

Exemplary System Embodiment

Figure 7:
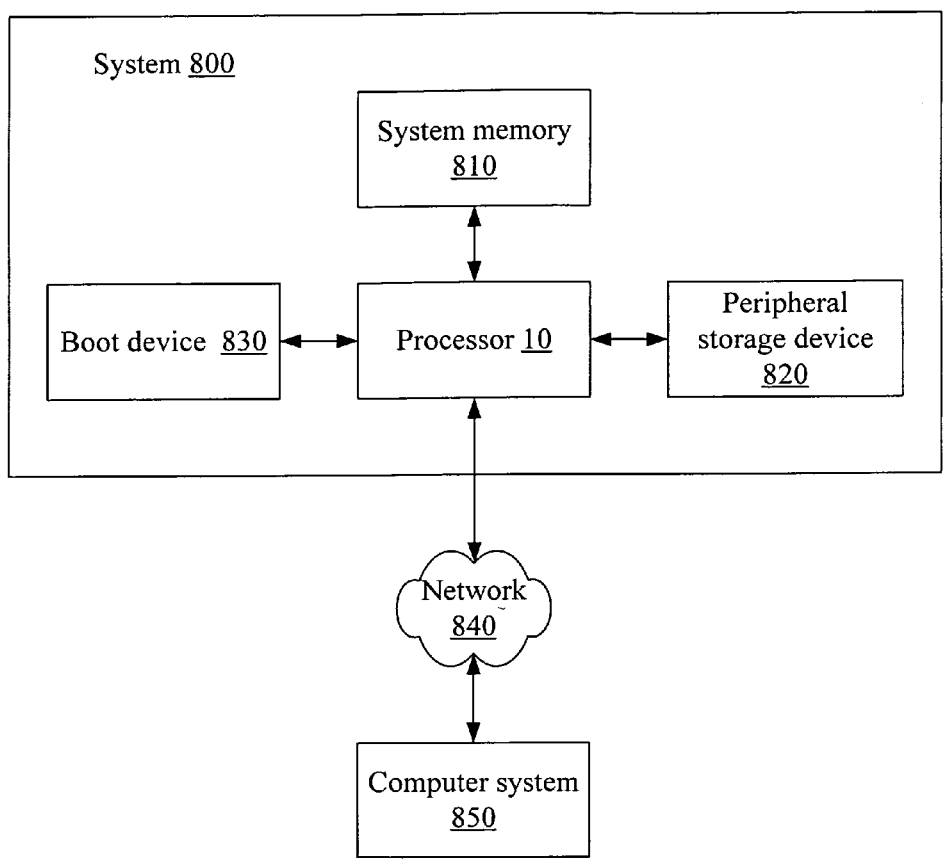
FIG. 7 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 7. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
a cache;
a cache miss unit coupled to the cache, wherein the cache miss unit is configured to initiate a cache fill of a cache line for the cache responsive to a first cache miss in the cache, wherein the first cache miss corresponds to a first thread of a plurality of threads in execution by the processor, and wherein the cache miss unit is further configured to record an additional cache miss corresponding to a second thread of the plurality of threads, wherein the additional cache miss occurs in the cache prior to the cache fill completing for the cache line, and wherein the cache miss unit is configured to inhibit initiating an additional cache fill responsive to the additional cache miss; and
a fetch unit coupled to the cache and the cache miss unit, wherein the fetch unit is configured to inhibit scheduling the first thread responsive to the first cache miss, and wherein the fetch unit, in response to a redirect of the first thread to a redirect address that is different from a fetch address that caused the first cache miss and further in response to the cache fill corresponding to the first cache miss having been initiated, is configured to re-enable scheduling of the first thread to fetch the redirect address from the cache, and wherein the fetch unit is configured to inhibit scheduling of the first thread responsive to a subsequent second cache miss for a fetch of the first thread and the second cache miss requires a second cache fill of a second cache line different from the cache line corresponding to the first cache miss, wherein the fetch unit is configured to inhibit scheduling the first thread responsive to the second cache miss until the cache fill corresponding to the first cache miss completes for the cache line, including writing the cache line to the cache, and wherein the fetch unit is configured to inhibit scheduling the first thread even though instructions from the cache line corresponding to the first cache miss are no longer needed by the first thread, and wherein the redirect occurs in response to the processor executing a previous instruction from the first thread and causes fetching to beginning at the redirect address instead of addresses generated by the fetch unit.

2. The processor as recited in claim 1 wherein, in response to a redirect of the second thread, the cache miss unit is configured to cancel the additional cache miss corresponding to the second thread.

3. The processor as recited in claim 1 wherein, in response to a redirect of the first thread prior to the cache fill being initiated, the cache miss unit is configured to inhibit initiating the cache fill if the additional miss has not been detected.

4. The processor as recited in claim 1 wherein the fetch unit is further configured to inhibit scheduling the second thread responsive to the additional miss.

5. The processor as recited in claim 4 wherein, in response to a redirect of the second thread, the fetch unit is configured to enable scheduling of the second thread.

6. The processor as recited in claim 1 wherein, in response to a redirect of the first thread, the fetch unit is configured to enable scheduling of the first thread if the cache fill has not been initiated and the additional miss has not occurred.

7. The processor as recited in claim 6 wherein, in response to a redirect of the first thread, the fetch unit is configured to re-enable scheduling of the first thread until the second cache miss is detected if the additional miss has occurred.

8. The processor as recited in claim 7 wherein the second cache miss is permitted for the first thread subsequent to the cache fill completing for the first cache miss.

9. The processor as recited in claim 1 wherein the cache is an instruction cache.

10. The processor as recited in claim 1 wherein the cache is a data cache.

11. A method comprising:
detecting a first cache miss for a cache line in a cache, wherein the first cache miss corresponds to a first thread of a plurality of threads;
inhibiting scheduling the first thread for fetching instructions responsive to the first cache miss;
initiating a cache fill of the cache line responsive to the first cache miss;
recording an additional cache miss corresponding to a second thread of the plurality of threads, wherein the additional cache miss occurs in the cache prior to the cache fill completing for the cache line;
inhibiting initiating an additional cache fill responsive to the additional cache miss; and
in response to a redirect of the first thread to a redirect address that is different from a fetch address that caused the first cache miss and the initiating of the cache fill: re-enabling scheduling of the first thread to fetch from the redirect address; detecting a subsequent second cache miss for a fetch of the first thread and the second cache miss requires a second cache fill of a second cache line different from the cache line corresponding to the first cache miss; and inhibiting scheduling the first thread to fetch in response to detecting the second cache miss until the cache fill corresponding to the first cache miss completes, including writing the cache line to the cache, even though instructions from the cache line corresponding to the first cache miss are no longer needed by the first thread, and wherein the redirect occurs in response to the processor executing a previous instruction from the first thread and causes fetching to beginning at the redirect address instead of addresses generated by the fetch unit.

12. The method as recited in claim 11 further comprising, in response to a redirect of the second thread, cancelling additional cache miss corresponding to the second thread.

13. The method as recited in claim 11 further comprising inhibiting scheduling the second thread for fetching instructions responsive to the additional miss.

14. The method as recited in claim 13 further comprising, in response to a redirect of the second thread, enabling scheduling of the second thread.

15. The method as recited in claim 14 further comprising, in response to a redirect of the first thread, enabling scheduling of the first thread if the cache fill has not been initiated and the additional miss has not occurred.

16. The method as recited in claim 15 further comprising, in response to a redirect of the first thread, enabling scheduling of the first thread until the second cache miss is detected if the additional miss has occurred.

17. A processor comprising:
a cache;
a cache miss unit coupled to the cache, wherein the cache miss unit is configured to record a primary miss to a cache line in the cache responsive to detecting the primary cache miss corresponding to a first thread of a plurality of threads in execution by the processor, and wherein, if one or more duplicate cache misses to the cache line are detected corresponding to one or more other threads of the plurality of threads, the cache miss unit is configured to record the duplicate cache misses, and wherein the cache miss unit is configured to initiate a single cache fill corresponding to the primary miss and the duplicate cache misses; and
a fetch unit coupled to the cache and the cache miss unit, wherein the fetch unit is configured to inhibit scheduling the first thread responsive to the first cache miss, and wherein the fetch unit, in response to a redirect of the first thread to a redirect address that is different from a fetch address that caused the first cache miss and further in response to the cache fill having been initiated, is configured to re-enable scheduling of the first thread to fetch the redirect address from the cache, and wherein the fetch unit is configured to inhibit scheduling of the first thread responsive to a subsequent second cache miss for a fetch of the first thread and the second cache miss requires a second cache fill of a second cache line different from the cache line corresponding to the first cache miss, wherein the fetch unit is configured to inhibit scheduling the first thread in response to the second cache miss until the cache fill corresponding to the first cache miss completes for the cache line, including writing the cache line to the cache, and wherein the fetch unit is configured to inhibit scheduling the first thread even though instructions from the cache line corresponding to the first cache miss are no longer needed by the first thread is not waiting for instructions from the cache line, and wherein the redirect occurs in response to the processor executing a previous instruction from the first thread and causes fetching to beginning at the redirect address instead of addresses generated by the fetch unit.

18. The processor as recited in claim 17 wherein the cache miss unit is configured to cancel a first duplicate cache miss corresponding to a second thread of the plurality of threads responsive to a redirect of the second thread.

19. The processor as recited in claim 17 wherein, in response to a redirect of the first thread prior to the cache fill being initiated, the cache miss unit is configured to cancel the primary cache miss if no duplicate cache misses have been recorded.

* * * * *